US010149560B2

(12) United States Patent
 Dove

(10) Patent No.: US 10,149,560 B2
(45) Date of Patent: Dec. 11, 2018

(54) COLORABLE TABLECLOTH

(71) Applicant: KTBT Dream Enterprises, LLC, San Antonio, TX (US)

(72) Inventor: Megan Dove, Danville, KY (US)

(73) Assignee: KTBT Dream Enterprises, LLC, San Antonio, TX (US)

( * ) Notice: Subject to any disclaimer, the term of this patent is extended or adjusted under 35 U.S.C. 154(b) by 0 days.

(21) Appl. No.: 15/420,742

(22) Filed: Jan. 31, 2017

(65) Prior Publication Data

US 2017/0215609 A1 Aug. 3, 2017

Related U.S. Application Data

(60) Provisional application No. 62/289,495, filed on Feb. 1, 2016.

(51) Int. Cl.
 *B32B 3/00* (2006.01)
 *A47G 11/00* (2006.01)
 *B32B 27/12* (2006.01)
 *D06Q 1/00* (2006.01)
 *G09B 1/00* (2006.01)
 *G09B 11/10* (2006.01)

(52) U.S. Cl.
 CPC ............ *A47G 11/003* (2013.01); *B32B 27/12* (2013.01); *D06Q 1/00* (2013.01); *G09B 1/00* (2013.01); *G09B 11/10* (2013.01); *B32B 2262/062* (2013.01)

(58) Field of Classification Search
 CPC ........ A47G 11/003; B32B 27/17; D06Q 1/00; G09B 1/00; G09B 11/10
 See application file for complete search history.

(56) References Cited

U.S. PATENT DOCUMENTS

| | | | |
|---|---|---|---|
| 7,103,916 B1 * | 9/2006 | Goodew | A41B 13/10 2/49.1 |
| 2001/0051280 A1 * | 12/2001 | Callicott | C08G 18/10 428/483 |
| 2002/0146534 A1 * | 10/2002 | Kaufman | A47G 11/003 428/88 |

* cited by examiner

*Primary Examiner* — Elizabeth E Mulvaney
(74) *Attorney, Agent, or Firm* — Gunn, Lee & Cave, P.C.; John C. Cave

(57) ABSTRACT

A colorable tablecloth configured for covering a table and allowing individuals, especially children to utilize markers and crayons on a top surface of the tablecloth. The colorable tablecloth has a first fabric layer, a printed design, a second finishing layer and a laminate backing.

20 Claims, 2 Drawing Sheets

COLORABLE TABLECLOTH

This application claims the benefit of U.S. Provisional Patent Application Ser. No. 62/289,495 filed on Feb. 1, 2016, the disclosure of which is incorporated herein by reference.

TECHNICAL FIELD

This disclosure relates generally to tablecloths and, more particularly, to a multiple layer fabric tablecloth configured for use with permanent and washable markers and crayons to entertain families and friends, especially young children at any occasion, including family functions, social events and classroom projects.

BACKGROUND

Parents, grandparents, babysitters and teachers are always looking for options to keep their children and students occupied and engaged in fun and exciting activities. It is well known that children enjoy expressing themselves by coloring with crayons and markers. While there are numerous coloring options available to parents and teachers, such as coloring books and mats, children often enjoy non-traditional coloring options, which is likely why children will draw on walls, tables, desks and other furniture. In addition to young children and toddlers, people of all ages including teens and adults enjoy coloring.

One particular type of coloring activity is coloring on a tablecloth at family activities and dining events. For example, many restaurants use paper tablecloths and provide crayons to children during dining. While paper tablecloths allow the children to draw during dining, these tablecloths are not durable, difficult to save and not reusable. In addition to paper tablecloths, plastic activity mats, bed sheets and canvas tablecloths are available for coloring activities for children. However, each of these options also has their disadvantages.

For example, none of these options has any designs, so children are forced to simply free-hand draw pictures, which can be difficult for younger children. In addition, the plastic activity mats are designed primarily for markers because crayons cannot draw on the plastic material. Moreover, the plastic material does not absorb the marker ink, so they are messy and not intended to be saved for display. While a bed sheet may be used for crayons or markers, the material of the bed sheet allows the marker to bleed through, which may damage the surface underneath the bed sheet. Furthermore, bed sheets are typically made of a thin material, which bunches and makes coloring difficult, especially for children. Finally, the thick canvas cloth also does not prevent a marker from bleeding through and the texture of the canvas cloth can be difficult to color.

Accordingly, there is a need for a more effective tablecloth specifically designed for allowing people, especially children to draw with crayons and markers. The colorable tablecloth should provide a fabric that is easy to draw on with crayons or markers, yet prevent the marker from bleeding through to damage the surface underneath the tablecloth. Finally, the colorable tablecloth should provide design objects and/or images to further engage the people coloring the tablecloth. The designs are customizable such that they range from easy designs more suitable for young children to more advanced designs such that they are challenging and stimulating for adults too.

SUMMARY

In accordance with one aspect of the disclosure, a colorable tablecloth is disclosed. The colorable tablecloth has a first layer, a printed design, a finishing layer and a laminate backing layer. The first layer may be a poly-cotton blend fabric. The printed design may be a black-outline coloring print. The second layer may be a plain finish and have a chemical treatment. The laminate backing layer may be a polyurethane laminate membrane and include a gripping element on a bottom surface for adhering to a table.

In another aspect of this disclosure, a reusable, colorable tablecloth is disclosed. The reusable, colorable tablecloth includes a top layer, a bottom layer, and an intermediate layer positioned between the top layer and the bottom layer. The top layer may be a plain finish treatment, while the intermediate layer may be made of a durable fabric. The top layer is applied to the intermediate layer. The intermediate layer may be imprinted with a colorable design. The bottom layer may be made of a laminate backing, wherein the laminate backing is a polyurethane laminate.

In yet another aspect of this disclosure, a multi-layer, colorable tablecloth configured for use with markers and crayons is disclosed. The multi-layer, colorable tablecloth has a first fabric layer and a second finishing layer. A top surface of the first fabric layer has a printed, washable colorable surface with a plurality of designs. A bottom surface of the first fabric layer is laminated and has a gripping element for adhering to a table.

BRIEF DESCRIPTION OF THE DRAWINGS

The accompanying drawings incorporated in and forming a part of the specification, illustrate several aspects of this disclosure, and together with the description serve to explain the principles of the disclosure. In the drawings.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized and that process or other changes may be made without departing from the scope of the disclosure. The following detailed description is not to be taken in a limiting sense, and the scope of the invention is defined only by the appended claims and their equivalents. In accordance with the disclosure, a colorable tablecloth is hereinafter described.

Figure 1:
FIG. 1 is a top view of a colorable tablecloth forming one aspect of this disclosure.
Figure 2:
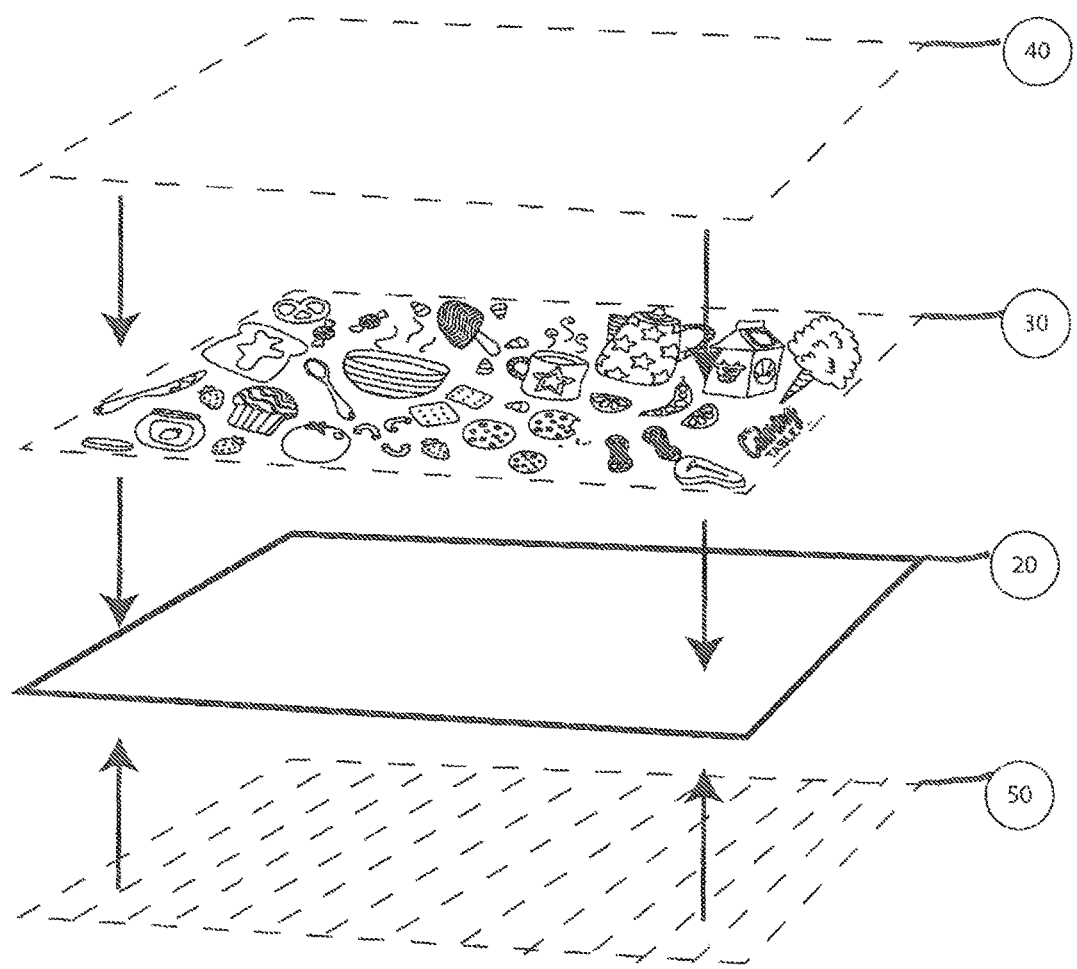
FIG. 2 is a side view illustrating each layer of the colorable tablecloth forming one aspect of this disclosure.

As shown in FIGS. 1 and 2, the colorable tablecloth 10 is designed to create unique and entertaining activities for individuals of all ages, especially young children. The colorable tablecloth 10 may employ one or more fabrics, which are smooth to the touch and uniquely crafted to protect the table, floor or other furniture supporting the tablecloth from damage from the use of markers and crayons. The colorable tablecloth 10 washes easily via machine-wash or hand-wash and holds the color of the markers and crayons beautifully.

As perhaps best shown in FIG. 2, the colorable tablecloth 10 is typically comprised of at least two layers. In one particular embodiment, the colorable tablecloth 10 has four components, including a first fabric layer 20, a printed design 30, a finishing "layer" 40 and a laminate backing layer 50. The colorable tablecloth 10 is configured for placing over a table to allow a wide age range of individuals, especially children to participate in a coloring activity without creating a huge mess and without the need for numerous materials.

The first layer 20 is typically a durable, fabric layer, preferably made of a poly-cotton Dover Oxford fabric. The first layer 20 may be 60% cotton and 40% polyester blend composition with a thread count of 47/2×52 and a yarn count of 32×12s. Thread count is a measure of how many threads are in one square inch of fabric. There is a warp thread, which refers to the thread that runs lengthwise and a weft thread, which refers to the woven thread that runs over and under the warp thread. In this embodiment described herein, the warp thread is 52 and the weft thread is 47/2. The fabric density per square inch may be 92×50. The fabric weight may be 4.4 ounces per square yard. The fabric measure may be 64" wide. The fabric color may be bleach white. Of course, it should be appreciated that other embodiments with different materials, dimensions and colors are possible with the first layer 20.

Referring back to FIG. 1, the printed design 30 may come in numerous different designs and styles. It is typically a black outline design that allows the individual, such as a child to color a particular design object on the tablecloth. The black outline design is easier for younger children or toddlers to color than trying to draw pictures free-hand. Furthermore, the black outline design allows slightly older children to work on their fine motor skills by staying within the lines of the design. The unique black outline design or printed design 30 is typically applied to or printed on the first fabric layer 20 of the tablecloth 10 with a 160 Grams per Square Meter (gsm) black ink via a rotary screen printer.

The second layer 40 is a fabric finish or finishing layer, which is actually simply a bath or chemical treatment. The second layer 40 is typically referred to as a plain finish that is employed in the final stage of fabric production wherein a chemical treatment is applied to the first fabric layer to ensure that there is stability and protection of the weave in the fabric. In more detail, the finish is a chemical bath wherein both sides of the fabric are bathed in a plain finish. Generally, a "plain finish" means that it does not include any extra chemical baths often used in textiles, such as soil-release or stain-prevention or stain-resistant chemicals included in the finishing bath. The process of the "plain finish" used on the fabric after weaving, includes singeing, decizing (a textile term generally referring to the cleaning of the fabric), bleaching and fabric heat setting, i.e., the fabric is placed in a high, dry heat to establish the stability of the fabric and to give it its wrinkle-resistant component.

The laminate backing layer 50 is 1 mil polyurethane laminate membrane backing with a gripping technology to prevent the fabric from sliding around on a smooth surface. In more detail, the lamination of the fabric is composed of a 30 gsm thermoplastic polyurethane that is applied to the printed, finished fabric with heat. The thermoplastic polyurethane is heat laminated with a textured film, which acts as the gripping technology. As a result of the use of the textured film, the tablecloth 10 does not easily slip off or slide around the table, which makes it is easier for children to color on the tablecloth.

Advantageously, the colorable tablecloth 10 is easy to use and requires essentially zero preparation time. Furthermore, the colorable tablecloth is available for use with crayons, permanent fabric markers or washable markers. The colorable tablecloth is a great tool for children with special needs. For example the coloring tablecloth provides a safe space for children who do not have fine motor skills. The coloring tablecloth creates a relaxing experience and many children of different skill levels can work collaboratively on the same activity. Furthermore, the designs on the coloring tablecloth may be helpful with speech therapy.

Due to the option of employing multiple fabrics in the tablecloth, it may be saved for a lasting keepsake from a special event. Not only may the tablecloth be saved for display or the like, but it is machine-washable and wrinkle-free so it can be used multiple times if desired. Furthermore, the tablecloth prevents any markers from bleeding through and damaging the surface underneath the tablecloth.

The foregoing descriptions of various embodiments have been presented for purposes of illustration and description. These descriptions are not intended to be exhaustive or to limit the invention to the precise forms disclosed. The embodiments described provide the best illustration of the inventive principles and their practical applications to thereby enable one of ordinary skill in the art to utilize the disclosure in various embodiments and with various modifications as are suited to the particular use contemplated.

I claim:

1. A colorable tablecloth, comprising:
    a first layer of fabric having a top face that is absorbent and capable of being colored with permanent or washable fabric ink markers;
    a printed design applied to the top face of the first layer;
    a finishing layer applied to the top face of the first layer; and
    a laminate backing layer positioned adjacent the bottom face of the first layer.

2. The colorable tablecloth according to claim 1, wherein the first layer is a poly-cotton blend fabric.

3. The colorable tablecloth according to claim 1, wherein the printed design is a black-outline coloring print.

4. The colorable tablecloth according to claim 1, wherein the finishing layer is a plain finish.

5. The colorable tablecloth according to claim 4, wherein the finishing layer includes a chemical treatment.

6. The colorable tablecloth according to claim 1, wherein the laminate backing layer is a polyurethane laminate membrane.

7. The colorable tablecloth according to claim 6, wherein the laminate backing layer includes a gripping element on a bottom surface for adhering to a table.

8. A reusable, colorable tablecloth, comprising:
    a first layer of material having an absorbent top surface capable of being colored with permanent or washable fabric ink markers;
    a finishing layer applied to the top surface of the first layer of material; and
    a second layer of material positioned below said first layer.

9. The reusable, colorable tablecloth according to claim 8, wherein said finishing layer is a plain finish treatment.

10. The reusable, colorable tablecloth according to claim 8, wherein said first layer of material is made of a woven fabric.

11. The reusable, colorable tablecloth according to claim 8, wherein said first layer of material is imprinted with a colorable design.

12. The reusable, colorable tablecloth according to claim 8, wherein said second layer of material is a laminate backing.

13. The reusable, colorable tablecloth according to claim 12, wherein the laminate backing is a polyurethane laminate.

14. A multi-layer, colorable tablecloth configured for use with markers and crayons, comprising:
- a fabric layer having an absorbent top surface;
- a finishing layer applied to the top surface of said first fabric layer; and
- a laminate layer applied to the bottom surface of the first fabric layer.

15. The multi-layer, colorable tablecloth according to claim 14, wherein said top surface of the fabric layer has a printed surface capable of being colored with washable or permanent fabric ink markers.

16. The multi-layer, colorable tablecloth according to claim 15, wherein the printed surface is washable.

17. The multi-layer, colorable tablecloth according to claim 16, wherein the printed surface has a plurality of designs.

18. The multi-layer, colorable tablecloth according to claim 17, wherein the laminate layer includes a gripping element for adhering to a resting surface.

19. The multi-layer, colorable tablecloth according to claim 1, wherein said finishing layer prevents bleeding within the printed design.

20. The multi-layer, colorable tablecloth according to claim 1, wherein said laminate backing provides an ink barrier.

* * * * *